(12) United States Patent
Hamilton et al.

(10) Patent No.: US 6,608,421 B1
(45) Date of Patent: Aug. 19, 2003

(54) CONTROLLED COMPLIANCE ROTOR WINDING SUPPORT BLOCK

(75) Inventors: Robert G. Hamilton, Schenectady, NY (US); Thomas Blakelock, Schenectady, NY (US); Leonard P. Squillacioti, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/058,114

(22) Filed: Jan. 29, 2002

(51) Int. Cl.[7] .................................. H02K 1/24

(52) U.S. Cl. ........................ 310/218; 310/269

(58) Field of Search .................. 310/269, 261, 310/264, 265, 194, 218

(56) References Cited

U.S. PATENT DOCUMENTS

| | | | | | |
|---|---|---|---|---|---|
| 2,736,829 A | * | 2/1956 | Sills | ........................... | 310/218 |
| 3,108,200 A | * | 10/1963 | Baldwin | ..................... | 310/218 |

FOREIGN PATENT DOCUMENTS

| | | | | | |
|---|---|---|---|---|---|
| AT | 191006 | * | 7/1957 | ................. | 310/269 |
| DE | 710116 | * | 4/1937 | ................. | 310/218 |
| DE | 1003341 | * | 2/1957 | ................. | 310/218 |
| DE | 1134748 | * | 8/1962 | ................. | 310/218 |
| FR | 424120 | * | 5/1911 | ................. | 310/218 |
| GB | 176629 | * | 3/1922 | ................. | 310/218 |

* cited by examiner

*Primary Examiner*—Burton Mullins
(74) *Attorney, Agent, or Firm*—Nixon & Vanderhye PC

(57) ABSTRACT

The invention comprises a two part rotor coil support block, wherein a spring disposed between the two block halves allows for the thermal expansion of coils wound around the assembled block.

4 Claims, 3 Drawing Sheets

CONTROLLED COMPLIANCE ROTOR WINDING SUPPORT BLOCK

BACKGROUND AND SUMMARY OF THE INVENTION

The present invention relates to a controlled compliance rotor winding support block. More particularly the support block will allow the control and minimization of coil expansion forces exerted on the rotor forging of a turbine generator. This control is accomplished by the use of a non-conducting spring captured within a non-conducting block assembly.

Service reliability problems have been encountered with prior art support blocks. Support blocks in the prior art fit tightly between the rotor coils and the adjacent rotor steel. With this tight fit, low support block, high thermal expansion forces are transferred from the copper windings to the main shaft forging. These forces cause the main forging to bend causing increased unbalance with increased temperature. This thermal unbalance forces operators to reduce load or remove the unit from service.

The invention overcomes the problems in the prior art resulting from using rigid tight fitting blocks which cause thermal vibration problems and a continuing source of unit unavailability and economic loss. The invention solves the prior art problems by providing a robust, retrofit compliant block to the generator fleet which allows for thermal expansion while in service and thereby eliminates thermal unbalance.

In particular, a spring is used to compensate for the thermal expansion of the copper windings. The spring fits within a recess or pocket of one part of the block assembly and is held in place by the other part of the block assembly.

DETAILED DESCRIPTION OF THE INVENTION

The invention is an improvement in the rotor coil support blocking system used on large two and four pole rotors. A compliant block is used between the outermost copper coil and the steel shaft support structure. This block allows free expansion of the coils while minimizing the forces applied to the rotor structure. This invention is especially applicable to thermally sensitive rotors.

Figure 1:
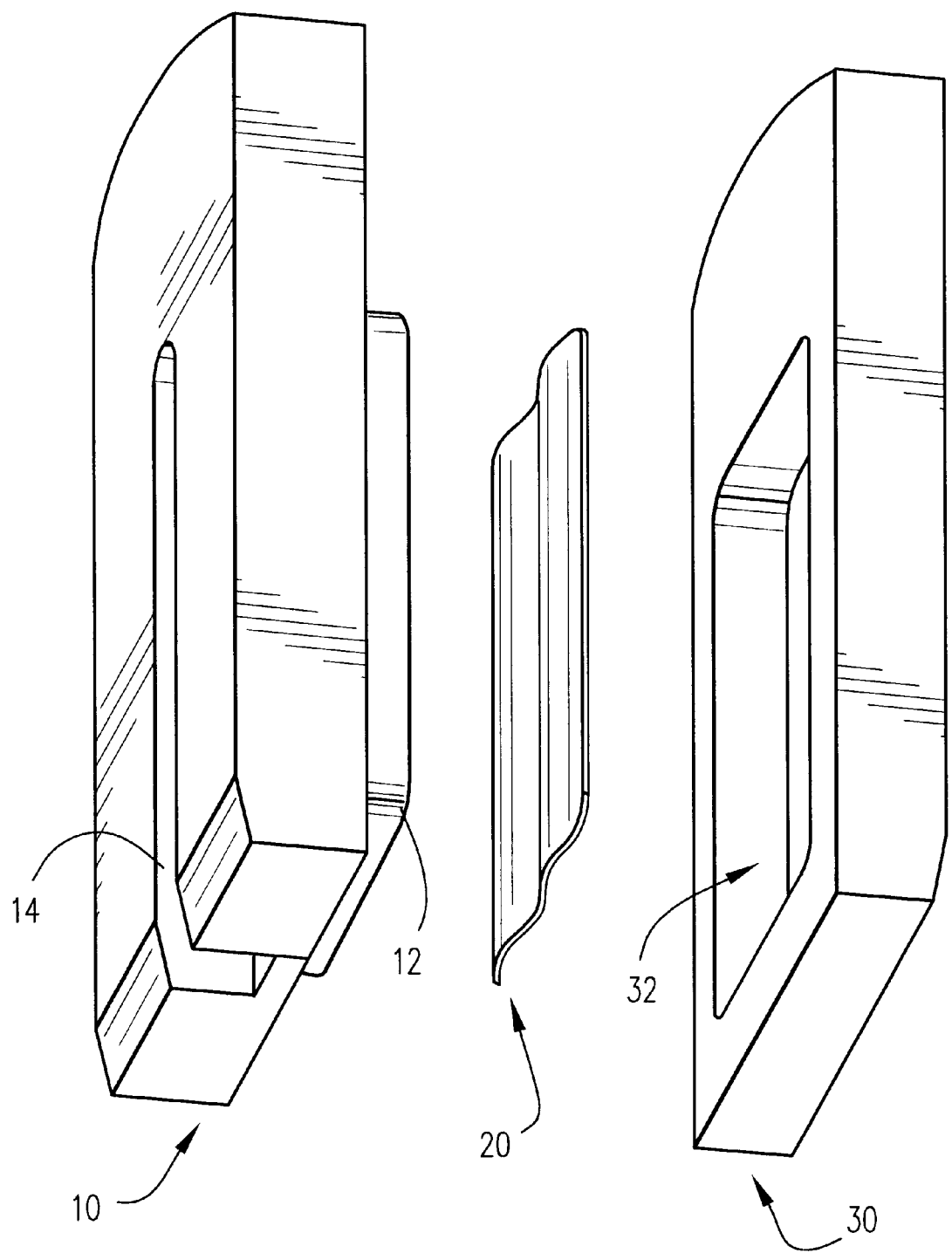
FIG. 1 is a perspective view of the components of an exemplary embodiment of the inventive support block.

As shown in FIG. 1 the present invention comprises three major components, first block half 10, spring 20 and second block half 30. In the preferred embodiment, first block half 10 is substantially rectangular and includes a protrusion 12 on one facing surface and an optional mounting groove 14 on an opposite facing surface. The mounting groove 14 is provided for assembly with a groove pin or rod (not shown). Second block half 30 includes a recess 32 which mates with the protrusion 12 of first block half 10. Spring 20 is configured to fit within recess 32 of first block half 30 and to be contacted by protrusion 12 on first block half 10.

Figure 2:
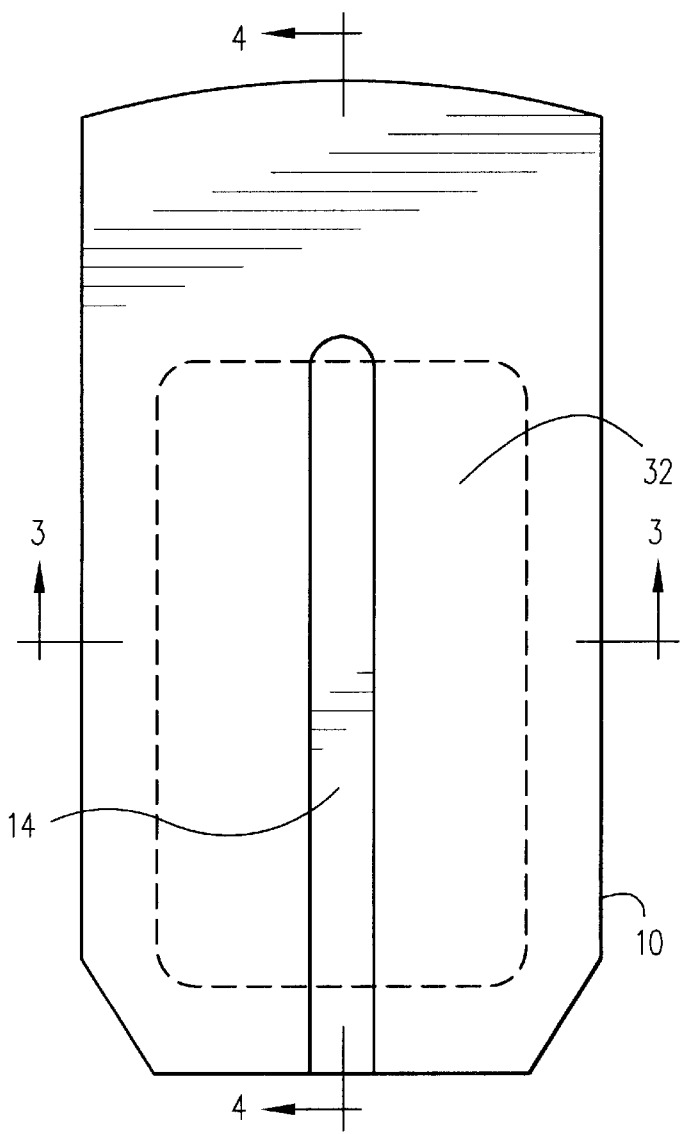
FIG. 2 is a frontal view of the assembled support block of FIG. 1.

FIG. 2 shows dashed lines indicating the profile of protrusion 12, recess 32, and spring 20 within. The radius of curvature at the corners of protrusion 12, recess 32, and spring 20 is approximately ¼ of an inch. The lower portions of the block halves 10 and 30 are tapered and the upper portions are curved.

Figure 3:
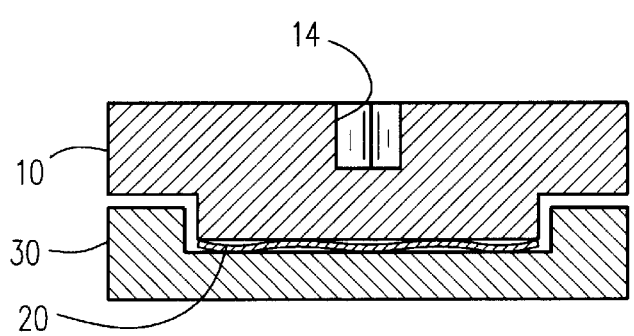
FIG. 3 is a cross sectional view along lines 3—3 of the assembled support block in FIG. 2.

FIG. 3 shows a cross sectional view of the three major components shown in FIG. 2 along cross sectional lines 3—3 of FIG. 2. As can be seen in FIG. 3, spring 20 is sandwiched between first half block 10 and second block half 30.

Figure 4:
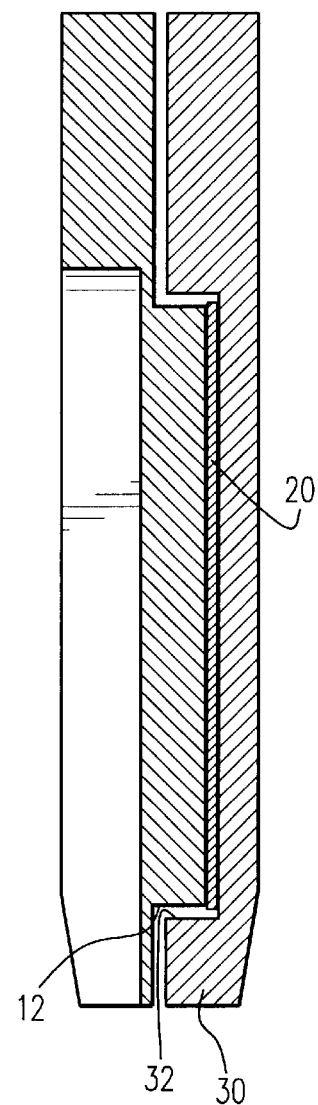
FIG. 4 is a cross sectional view along lines 4—4 of the assembled support block in FIG. 2.

FIG. 4 shows a cross sectional view of the assembled block, along cross sectional lines 4—4 of FIG. 2, with protrusion 12 of first half block 10 being set in to recess 32 of second half block 30 and with spring 20 disposed between the first and second block halves 10, 30. In the preferred embodiment spring 20 typically maintains a spacing between the first and second half blocks of 0.105 inches +/- 0.007 inches but when compressed the spring maintains a spacing between the two block halves of approximately 0.075 inches.

Figures 5, 6:
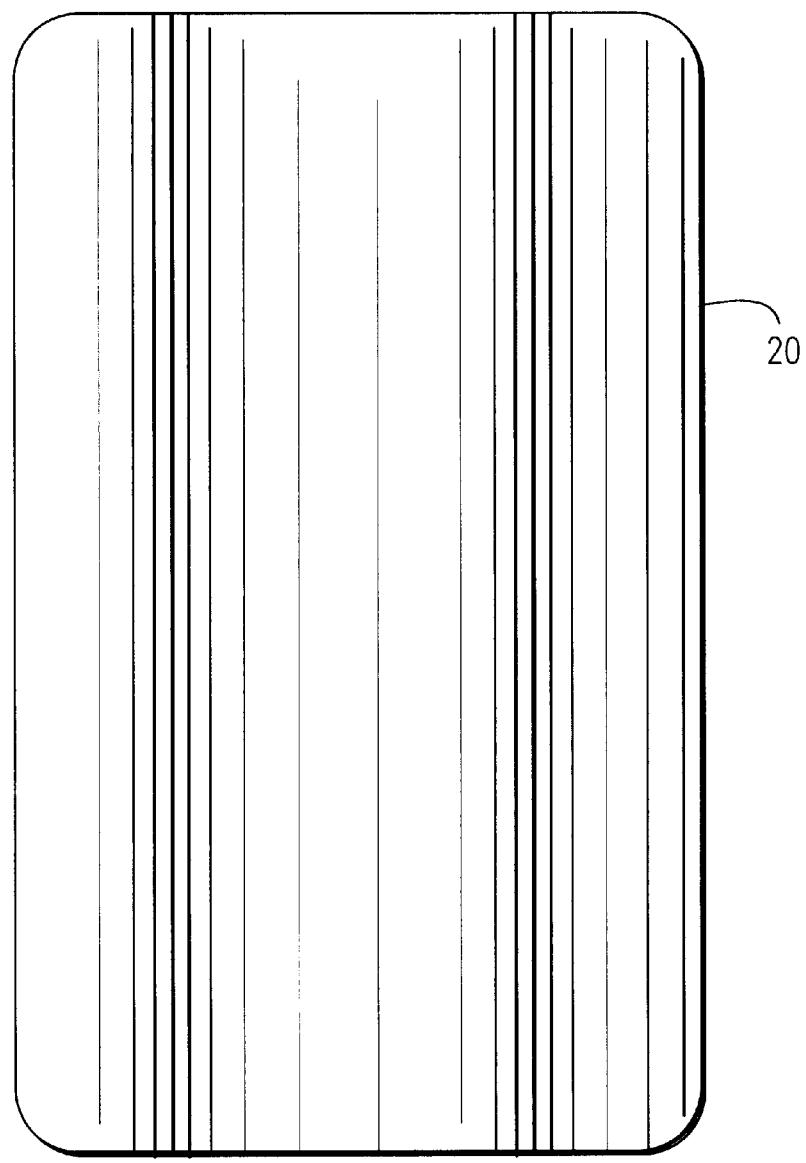
FIG. 5 is a top view of the spring of the support block of FIG. 1.
FIG. 6 is a frontal view of the spring of the support block of FIG. 1.

FIGS. 5 and 6 show the spring 20 in greater detail. Spring 20 is rectangular and approximately 2.36 inches by 4.00 inches with the aforementioned ¼ radius at its four corners. Spring 20 is a ripple spring having a pitch of approximately 1.18 inches between ripples. In the preferred embodiment a spring ripple is centered in the spring.

Although not shown, the windings around the spring block assembly maintain the three components in the physical arrangement described above. As the winding coils expand due to thermal effects, the spring is compressed taking up the thermal expansion of the winding coils.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor winding support block comprising:
    a first support block half being generally rectangular in shape and having a rectangular recess disposed in one facing surface;
    a spring shaped to fit within said rectangular recess of said first support block half; and
    a second support block half which mates with said first support block half wherein said spring is maintained in place between said first and second support block halves.

2. A rotor winding support block as in claim 1, said second support block half having a protrusion disposed in one facing surface which fits into said recess of said first support block half.

3. A rotor winding support block as in claim 1, said spring being a rectangularly shaped ripple spring.

4. A rotor winding support block as in claim 2, said spring being a rectangularly shaped ripple spring.

* * * * *